United States Patent
Shepard et al.

(10) Patent No.: US 11,042,004 B1
(45) Date of Patent: Jun. 22, 2021

(54) SYSTEM AND METHOD FOR ALIGNMENT OF OPTICAL BEAMS

(71) Applicant: Waymo LLC, Mountain View, CA (US)

(72) Inventors: Ralph Shepard, Mountain View, CA (US); Pierre-yves Droz, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 345 days.

(21) Appl. No.: 15/790,333

(22) Filed: Oct. 23, 2017

(51) Int. Cl.
| | |
|---|---|
| B32B 41/00 | (2006.01) |
| G02B 7/00 | (2021.01) |
| G02B 27/09 | (2006.01) |
| B29C 65/48 | (2006.01) |
| B29C 65/00 | (2006.01) |
| G01S 7/481 | (2006.01) |
| B29L 11/00 | (2006.01) |

(52) U.S. Cl.
CPC .......... *G02B 7/003* (2013.01); *B29C 65/4805* (2013.01); *B29C 66/87* (2013.01); *G01S 7/4815* (2013.01); *G02B 27/095* (2013.01); *G02B 27/0994* (2013.01); *B29L 2011/00* (2013.01)

(58) Field of Classification Search
CPC .. G02B 7/003; G02B 27/0994; G02B 27/095; B29C 65/4805; B29C 66/87; G01S 7/4815; B29L 2011/00
USPC ..................... 156/64, 350, 351, 378, 379, 60
See application file for complete search history.

(56) References Cited

U.S. PATENT DOCUMENTS

| | | | | |
|---|---|---|---|---|
| 4,884,015 A | * | 11/1989 | Sugimoto | ................ B23Q 1/36 318/640 |
| 5,311,535 A | * | 5/1994 | Karpinski | ............. H01S 5/4012 372/36 |
| 6,186,650 B1 | * | 2/2001 | Hulse | ................... B60Q 1/0011 362/459 |
| 2007/0177842 A1 | * | 8/2007 | Clark | ................... G02B 6/4227 385/52 |

(Continued)

FOREIGN PATENT DOCUMENTS

| | | |
|---|---|---|
| WO | 2002/075407 | 9/2002 |
| WO | 2014/175901 | 10/2014 |
| WO | 2016/070186 | 5/2016 |

*Primary Examiner* — Michael N Orlando
*Assistant Examiner* — Joshel Rivera
(74) *Attorney, Agent, or Firm* — McDonnell Boehnen Hulbert & Berghoff LLP

(57) ABSTRACT

Systems and methods can align of one or more optical beams with respect to one another, an optical axis, a far-field location, and/or a near-field location. An example method includes coupling, with an index-matched epoxy, a plurality of adjustable optical surfaces and an optical element. Each adjustable optical surface of the plurality of adjustable optical surfaces is associated with a respective light-emitter device of a plurality of light-emitter devices. Additionally, the method includes causing at least one light-emitter device to emit light that interacts with at least one adjustable optical surface and an optical element to provide a transmitted light beam. The method also includes receiving information about a beam profile of the transmitted light beam, comparing the beam profile to a desired beam profile, and adjusting a position of the at least one adjustable optical surface with respect to the optical element based on the comparison.

20 Claims, 7 Drawing Sheets

(56) References Cited

U.S. PATENT DOCUMENTS

2017/0160485 A1 6/2017 Wan
2017/0168143 A1 6/2017 Rezk et al.

* cited by examiner

Applying Index-Matched Epoxy to an Optical Element

Coupling Adjustable Optical Surfaces to the Optical Element

Fixing the Adjustable Optical Surfaces to the Optical Element

SYSTEM AND METHOD FOR ALIGNMENT OF OPTICAL BEAMS

BACKGROUND

Unless otherwise indicated herein, the materials described in this section are not prior art to the claims in this application and are not admitted to be prior art by inclusion in this section.

Optical systems may utilize a plurality of optical light beams for a variety of purposes. In some scenarios, obtaining correct alignment of such optical beams may be an important consideration with regard to the performance of the optical system.

In the case of light detection and ranging (LIDAR) devices, a plurality of light sources may emit light via optical beams into a given environment to provide estimated distances to objects in that environment. In such an example, misalignment of the optical beams may provide incorrect distance information, which may lead to imprecise localization of objects in the environment. Misalignment may additionally or alternatively impair light handling efficiency within the optical system. In such scenarios, the misalignment may reduce the ability of the optical system to detect targets and/or limit a maximum detection range.

Conventional optical systems may include various active or passive optical beam alignment means, such as focusing optics, mirrors, and/or mechanical alignment mechanisms.

SUMMARY

The present disclosure relates to systems and methods that provide alignment of optical beams in an optical system.

In a first aspect, an optical system is provided. The optical system includes a plurality of light-emitter devices and a plurality of adjustable optical surfaces. Each light-emitter device of the plurality of light-emitter devices is associated with a respective adjustable optical surface of the plurality of adjustable optical surfaces. The optical system also includes an optical element. The optical element is optically coupled to the plurality of adjustable optical surfaces and the plurality of light-emitter devices. The optical system additionally includes an index-matched epoxy that is optically coupled and physically coupled to the plurality of adjustable optical surfaces and the optical element. The optical system yet further includes a detector and a controller having at least one processor and a memory. The at least one processor executes program instructions stored in the memory so as to carry out operations. The operations include causing at least one light-emitter device of the plurality of light-emitter devices to emit light that interacts with at least one adjustable optical surface associated with the at least one light-emitter device and the optical element to provide a transmitted light beam. The operations include receiving, from the detector, information indicative of a beam profile of the transmitted light beam and comparing the beam profile to a desired beam profile. The operations yet further include, while the index-matched epoxy is in a liquid state, adjusting a position of the at least one adjustable optical surface with respect to the optical element based on the comparison. The operations also include, when the beam profile corresponds to the desired beam profile, maintaining a position of the at least one adjustable optical surface until the index-matched epoxy is in a solid state.

In a second aspect, a method is provided. The method includes coupling, with an index-matched epoxy, a plurality of adjustable optical surfaces and an optical element. Each adjustable optical surface of the plurality of adjustable optical surfaces is associated with a respective light-emitter device of a plurality of light-emitter devices. The method also includes causing at least one light-emitter device of the plurality of light-emitter devices to emit light that interacts with at least one adjustable optical surface associated with the at least one light-emitter device and an optical element to provide a transmitted light beam. The method additionally includes receiving, from a detector, information indicative of a beam profile of the transmitted light beam and comparing the beam profile to a desired beam profile. The method yet further includes, while the index-matched epoxy is in a liquid state, adjusting a position of the at least one adjustable optical surface with respect to the optical element based on the comparison. The method also includes, when the beam profile corresponds to the desired beam profile, maintaining a position of the at least one adjustable optical surface until the index-matched epoxy is in a solid state.

Other aspects, embodiments, and implementations will become apparent to those of ordinary skill in the art by reading the following detailed description with reference, where appropriate, to the accompanying drawings.

DETAILED DESCRIPTION

Figure 1:
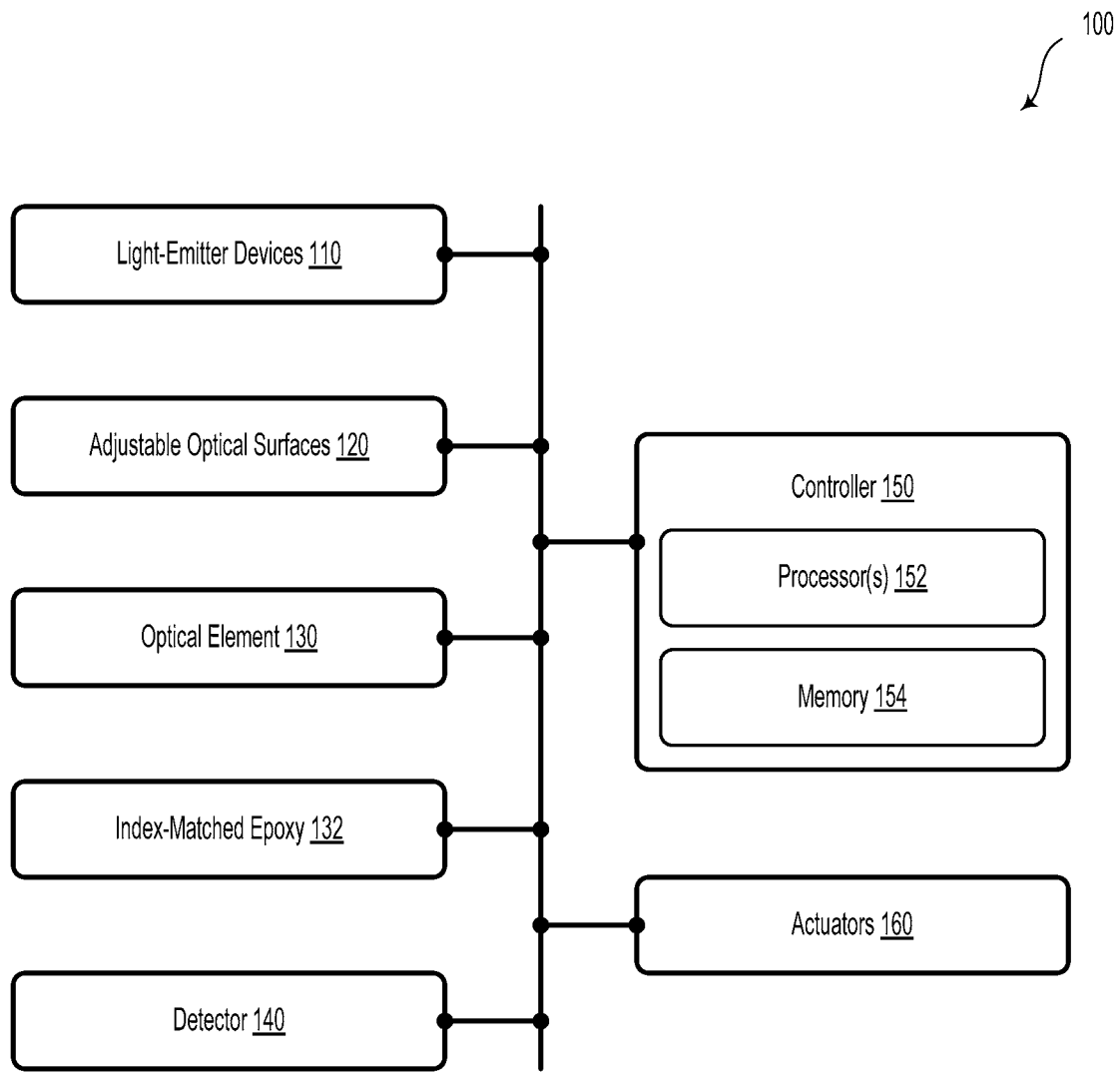
FIG. 1 illustrates an optical system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

As-manufactured optical elements (e.g., lenses or other transmissive and/or reflective optics) may have certain properties such as a magnification, a focal length, shape, etc. In some optical systems, such as LIDAR sensor systems, it may be desirable to "fine-tune" the properties of an optical element based on various aspects of the light passing through the system. For example, for a given input beam, it may be desirable to adjust the optical element so as to improve or optimize performance of the optical element and overall system.

For example, adjustable optical surfaces could be coupled to the optical element and adjusted while light is passing through the combination. Upon obtaining desirable transmission of light, the adjustable optical surface could be fixed to the optical element.

The present disclosure relates to various aspects of an optical system and methods for its manufacture. In some embodiments, the optical system could provide at least a portion of a transmit block and/or a receive block of a Light Detection and Ranging (LIDAR) system. Such LIDAR systems may provide information (e.g., point cloud data) indicative of objects in an environment of the LIDAR system. In some embodiments, the LIDAR system may provide such information to an autonomous or semi-autonomous vehicle (e.g., a self-driving car, self-driving truck, drone aircraft, etc.).

An example optical system receives light from multiple light sources and transmits multiple beams into the environment such that the transmitted beams are parallel to the optical axis of the optical system. Each light source transmits a respective beam toward the optical system at a respective angle to the optical axis. For example, two of the beams may be at positive angles and two of the beams may be at negative angles with respect to the optical axis. The optical system includes a plurality of adjustable optical surfaces that change the angles of the beams from the positive or negative angles transmitted by the light sources to a zero-angle direction (i.e., parallel to the optical axis) for transmission into the environment. In one example, each beam angle is adjusted by a respective adjustable optical surface that is attached to a lens by an index-matched optical adhesive.

With this arrangement, for instance, the adjustable optical surfaces can be used to account for misalignments between the light sources by adjusting a position of the optical surface with respect to the lens and/or with respect to the associated light source rather than aligning each of the plurality of light sources. The adjustable optical surfaces may be coupled to the lens element via an index-matched epoxy. Some embodiments may include causing the light source to emit light while its associated adjustable optical surface and the epoxy are still moveable. A camera or another type of photodetector may be used to observe an output beam shape or output beam profile. While observing the output beam profile, the adjustable optical surface may be moved so as to optimize or otherwise adjust the output beam profile until it is at a desired position or desired profile. Thereafter, the adjustable optical surface may be held in place until the epoxy is cured. In some embodiments, the epoxy may be cured using ultraviolet (UV) light and/or drying. In some embodiments, the disclosed approach may provide a lower cost alternative to other optical alignment methods.

In some implementations, the optical system may also include a diffuser that receives the co-aligned light beams (parallel to the optical axis) and spreads them to create a line image. Additionally, the diffuser could be configured to direct more energy of the light beams toward longer scanning ranges than shorter scanning ranges.

II. Example Systems

FIG. 1 illustrates an optical system 100, according to an example embodiment. The optical system 100 may include, among other elements, a plurality of light-emitter devices 110, a plurality of adjustable optical surfaces 120, an optical element 130, and an index-matched epoxy 132. Furthermore, the optical system 100 may include a detector 140, a controller 150, and, optionally, one or more actuators 160.

It will be understood that optical system 100 may include more or fewer elements. For example, optical system 100 may include a plurality of optical elements and/or a plurality of detectors or detector elements.

The plurality of light-emitter devices 110 could include, without limitation, one or more lasers, a light-emitting diode, or another type of light-emitting device.

The plurality of adjustable optical surfaces 120 could include one or more mirrors, waveguides, prisms, diffraction gratings, lenses, optical fibers, dielectric stacks, or other types of adjustable devices operable for use in optics. In an example embodiment, the adjustable optical surfaces 120 could be operable to be adjusted in their respective positions. For example, the adjustable optical surfaces 120 could be positioned at various angles, orientations, poses, or arrangements.

The optical element 130 could be, among other possibilities, a waveguide, a lens, an optical fiber, a diffraction grating, an aperture, a window, a mirror, or another type of optical element.

In some embodiments, each light-emitter device of the plurality of light-emitter devices 110 is associated with one or more respective adjustable optical surfaces of the plurality of adjustable optical surfaces 120. In such scenarios, the optical element 130 may be optically coupled to the plurality of adjustable optical surfaces 120 and the plurality of light-emitter devices 110.

The index-matched epoxy 132 could include an epoxy, a synthetic adhesive, a glue, an oil, a gel, a hydrogel, a cement, a photoresist, a polymer, or another type of fixing material operable to permanently or temporarily fix the respective positions of the plurality of adjustable optical surfaces 120 and the optical element 130. In some embodiments, the index-matched epoxy 132 could include an optical adhesive, such as a UV-light-curable adhesive.

The index-matched epoxy 132 could be operable to be administrated or delivered via a syringe or another type of liquid container. The index-matched epoxy 132 may have an initial viscosity when administered. For example, the initial viscosity of the index-matched epoxy 132 could be between 2,500 centipoise and 20,000 centipoise. Thus, the index-matched epoxy 132 could have a liquid-like viscosity (e.g., about 2,500 centipoise) or a gel-like viscosity (e.g., about 20,000 centipoise). However, other viscosities are possible and contemplated herein.

Furthermore, upon drying or curing, the index-matched epoxy 132 may have an optical index of refraction that is similar or identical to the plurality of adjustable optical surfaces 120 and/or the optical element 130. In other words, due to the optical index-matching property, light may pass from the adjustable optical surfaces 120 to the optical element 130 without substantial reflection or refraction. In an example embodiment, the index-matched epoxy 132 could have an index of refraction of about 1.5, though other indices of refraction are possible and contemplated herein.

The detector 140 could include one or more photodiodes, photoconductors, image sensors, focal plane array, or another type of photodetector. In an example embodiment, the detector 140 could be operable to detect light emitted by the light-emitter devices 110. Specifically, the detector 140 may observe, measure, and/or quantify at least a portion of the light that is emitted by the light-emitter devices 110 and transmitted through the plurality of adjustable optical surfaces 120 and optical element 130.

The controller 150 includes one or more processors 152 and at least one memory 154. The one or more processors 152 may include, for instance, an application-specific integrated circuit (ASIC) or a field-programmable gate array (FPGA). Other types of processors, computers, or devices configured to carry out software instructions are contemplated herein. The at least one memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The one or more processors 152 may be configured to execute program instructions stored in at least one memory 154 so as to carry out operations. As such, controller 150 may be configured to carry out any or all of the operations described herein. For example, controller 150 may carry out one or more operations as described in relation to FIGS. 4A-4E and method 500 as illustrated and described in relation to FIG. 5.

The actuators 160 could include, among other possibilities, a piezoelectric material, a motor, an extendible surface, an articulable surface, a gripper, a roller, a wheel, a rotor, or another type of movable object that could directly or indirectly adjust a position of at least one adjustable optical surface of the plurality of adjustable optical surfaces 120. Other types of actuators, including non-contact actuators (e.g., electrostatic and electromagnetic actuators) are possible and contemplated herein.

The controller 150 could be operable to cause at least one light-emitter device of the plurality of light-emitter devices 110 to emit light that interacts with the respective adjustable optical surface and the optical element 130 to provide a transmitted light beam. For example, the controller 150 could cause a first light-emitter device to emit light in a steady-state beam or as a series of light pulses. The emitted light may be transmitted, refracted, and/or reflected by the adjustable optical surface and the optical element to produce a transmitted light beam.

The operations include receiving, from the detector 140, information indicative of a beam profile of the transmitted light beam. As an example, the detector 140 may provide information to the controller 150 regarding a light intensity, a beam shape, a wavelength, and/or another property of the transmitted light beam.

The operations also include comparing the beam profile to a desired beam profile. For example, the controller 150 may compare the beam profile of the transmitted light beam with a desired intensity, a desired beam shape, a desired wavelength, and/or another desired property. In some embodiments, the desired beam profile may correspond to a desired beam spot size and/or a desired beam angle.

The operations yet further include, while the index-matched epoxy 132 is in a gel-like or liquid-like state, adjusting a position of the respective adjustable optical surface with respect to the optical element 130 based on the comparison. In example embodiments, the controller 150 could control one or more of the actuators 160 to move respective adjustable optical surfaces based on the comparison. For example, the actuators 160 may move an absolute position of the adjustable optical surfaces with respect to the optical element 130 (e.g., along x, y, and/or z axes). Additionally or alternatively, the actuators 160 may be configured to adjust an angle, a tilt, an orientation, and/or a pose of the adjustable optical surfaces with respect to the optical element 130.

The operations additionally include, when the beam profile corresponds to the desired beam profile, maintaining a position of the respective adjustable optical surface until the index-matched epoxy 132 is in a solid state. In other words, at such time that the beam profile measured by the detector 140 sufficiently matches or exceeds one or more parameters of the desired beam profile, the respective adjustable optical surface may be held in place until the index-matched epoxy 132 cures or otherwise solidifies.

For example, the detector 140 may periodically or continuously monitor the beam profile of the transmitted light beam and send information indicative of that beam profile to the controller 150. In such a scenario, the controller 150 may determine that the current beam profile spatially overlaps that of a desired beam profile. In response, the controller 150 may control the actuators 160 so as to maintain their position until the epoxy cures, fixing the position of the adjustable optical surface(s) with respect to the optical element 130.

Additionally or alternatively, the controller 150 may determine that the current beam profile intensity is greater than a desired beam profile intensity threshold, or is within a desired beam profile intensity range. In response, the controller 150 may control the actuators 160 similar to above so as to maintain their position until the epoxy cures, fixing the position of the adjustable optical surface(s) with respect to the optical element 130.

In some embodiments, the operations of controller 150 may additionally or alternatively include exposing the index-matched epoxy 132 to ultraviolet (UV) light so as to set, cure, solidify, and/or harden the index-matched epoxy 132.

Figure 2:
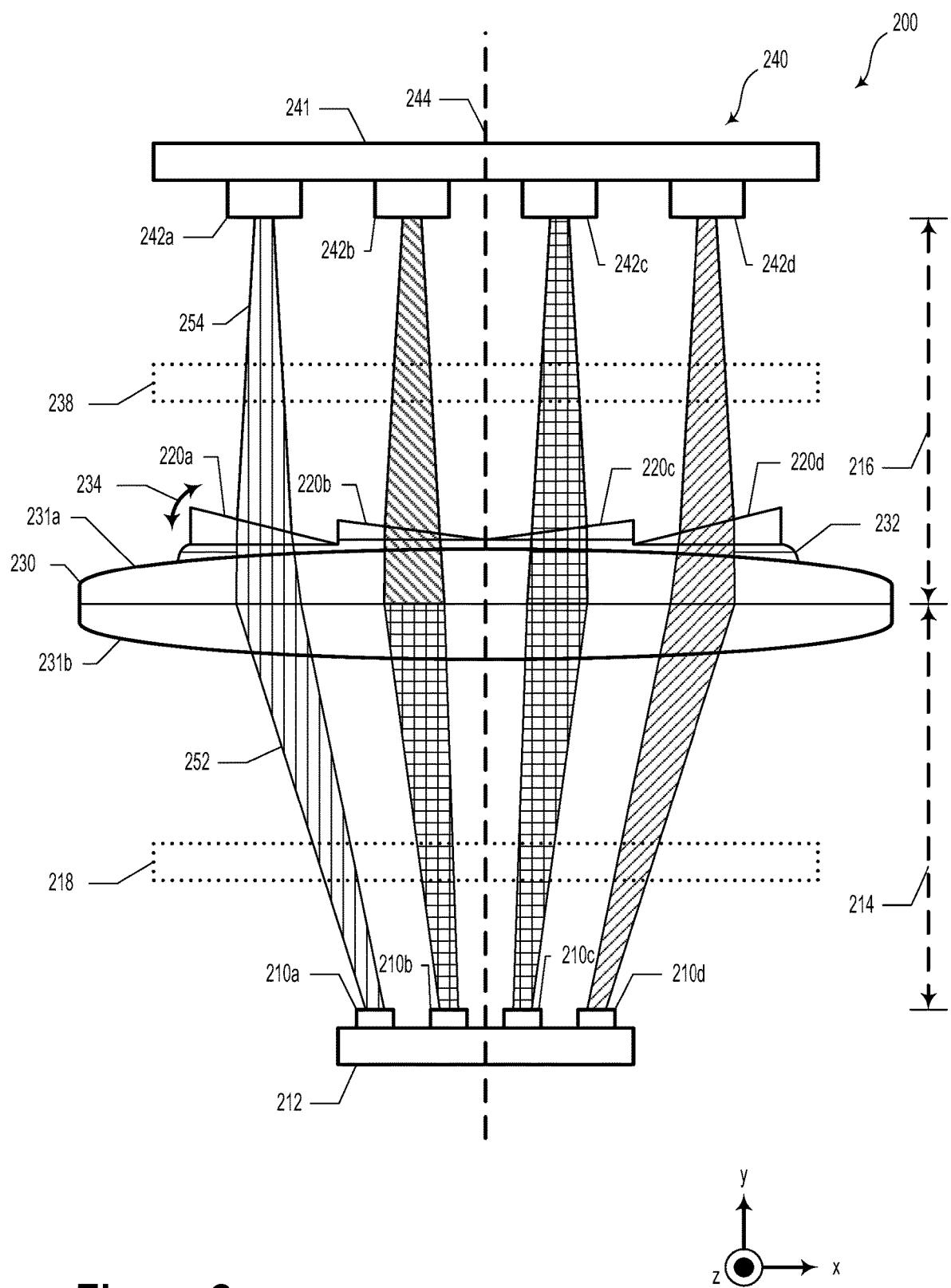
FIG. 2 illustrates an optical system, according to an example embodiment.

FIG. 2 illustrates an optical system 200, according to an example embodiment. Optical system 200 may be similar or identical to that of optical system 100. For example, the optical system 200 includes a plurality of light-emitter devices 210a-210d. It will be understood that while four light-emitter devices are illustrated in FIG. 2, other embodiments may include more or fewer light-emitter devices. The plurality of light-emitter devices 210a-210d could be coupled to substrate 212.

In example embodiments, the plurality of light-emitter devices 210a-d may include a plurality of laser bars and/or a plurality of laser bar stacks. Other types of light-emitter devices are possible.

The optical system 200 also includes a plurality of adjustable optical surfaces 220a-d. As illustrated in FIG. 2, each light-emitter device of the plurality of light-emitter devices 210a-d corresponds to a respective adjustable optical surface of the plurality of adjustable optical surfaces 220a-d. In other words, light-emitter device 210a may be configured to emit light toward adjustable optical surface 220a, light-emitter device 210b may be configured to emit light toward adjustable optical surface 220b, and so on. It will be understood that other correspondences are possible between the plurality of light-emitter devices 210a-d and the plurality of adjustable optical surfaces 220a-d. For example, multiple light-emitter devices could correspond with a single adjustable optical surface. Alternatively, a single light-emitter device could correspond to multiple adjustable optical surfaces. Yet further, a correspondence between respective light-emitter devices and respective adjustable optical surfaces could be adjustable.

In some embodiments, the plurality of adjustable optical surfaces 220a-d may include at least one of: a mirror, a dielectric layer stack, a coating, a plurality of wedge prisms or a plurality of transparent plates. In some embodiments, the plurality of adjustable optical surfaces 220a-d may include various materials, such as glass, polycarbonate, BK-7, polyimide, a chalcogenide material, a dichroic material, etc. Other types and compositions of adjustable optical surfaces are possible.

The optical system 200 includes an optical element 230, which could be similar or identical to optical element 130. In some embodiments, the optical element 230 may include at least one of: a lens or an optical diffuser. However, the optical element 230 may take other forms. In an example embodiment, the optical element 230 may be optically coupled to the plurality of adjustable optical surfaces 220a-d and the plurality of light-emitter devices 210a-d.

Similar to optical system 100 as described in relation to FIG. 1, optical system 200 may include an index-matched epoxy 232 that could be optically coupled and physically coupled to the plurality of adjustable optical surfaces 220a-d and the optical element 230. In some examples, the plurality of adjustable optical surfaces 220a-d, the optical element 230, and the index-matched epoxy 232 may include a similar or identical index of refraction when the index-matched epoxy 232 is in a solid state.

Furthermore, similar to optical system 100, optical system 200 may include a detector 240, which could include a plurality of detecting elements 242a-d. In an example embodiment, the detector could include a focal plane array or image sensor arranged along, and/or coupled to, a substrate 241. In some embodiments, the detector 240 may include an image sensor positioned at one of: a near-field location or a far-field location.

For instance, the detector 240 may be located at a distance 216 which may include an optical near-field location (e.g., within a few millimeters) with respect to the other elements of optical system 200. Additionally or alternatively, the detector 240 may be located at an optical far-field location (e.g., more than a few meters) with respect to the other elements of optical system 200. In some embodiments, a distance 214 between the light-emitter devices 210a-d and the optical element 230 may be maintained as substantially constant, with a possibility for fine position adjustments.

In some example embodiments, the emitted light 252 may include light beams having positive or negative angles with respect to optical axis 244. As such, the adjustable optical devices 220a-d may provide a way to correct for angular misalignments of the plurality of light beams emitted from the light-emitter devices. In other words, the light emitted by the light-emitter devices may interact with the optical element 230 and the adjustable optical surfaces 220a-d so as to provide a plurality of light beams that are substantially parallel to optical axis 244. In such scenarios, light pulses may be emitted along the the plurality of parallel light beams for transmission into the environment of the optical system.

While FIG. 2 illustrates the adjustable optical surfaces 220a-d as being coupled to a first surface 231a of the optical element 230, it will be understood that some or all of the adjustable optical surfaces could be coupled to a second surface 231b of the optical element 230, or another surface. Furthermore, while FIG. 2 illustrates the adjustable optical surfaces 220a-d as being symmetrically distributed about an optical axis 244, it will be understood that asymmetric orientations, beam angles, and beam properties are also possible and contemplated herein. For example, the adjustable optical surfaces 220a-d and the optical element 230 may interact with the emitted light 252 so as to form transmitted light 254 along a different optical axis (e.g., not optical axis 244).

It will be understood that FIG. 2 illustrates one of many possible optical arrangements. Other possible optical arrangements of optical system 200 may include further optical elements that may be located at various positions along the optical beam path, such as along the emitted light beam path 218 and/or along the transmitted light beam path 238. Further optical elements may be located elsewhere with respect to the illustrated elements of optical system 200.

Figure 3:
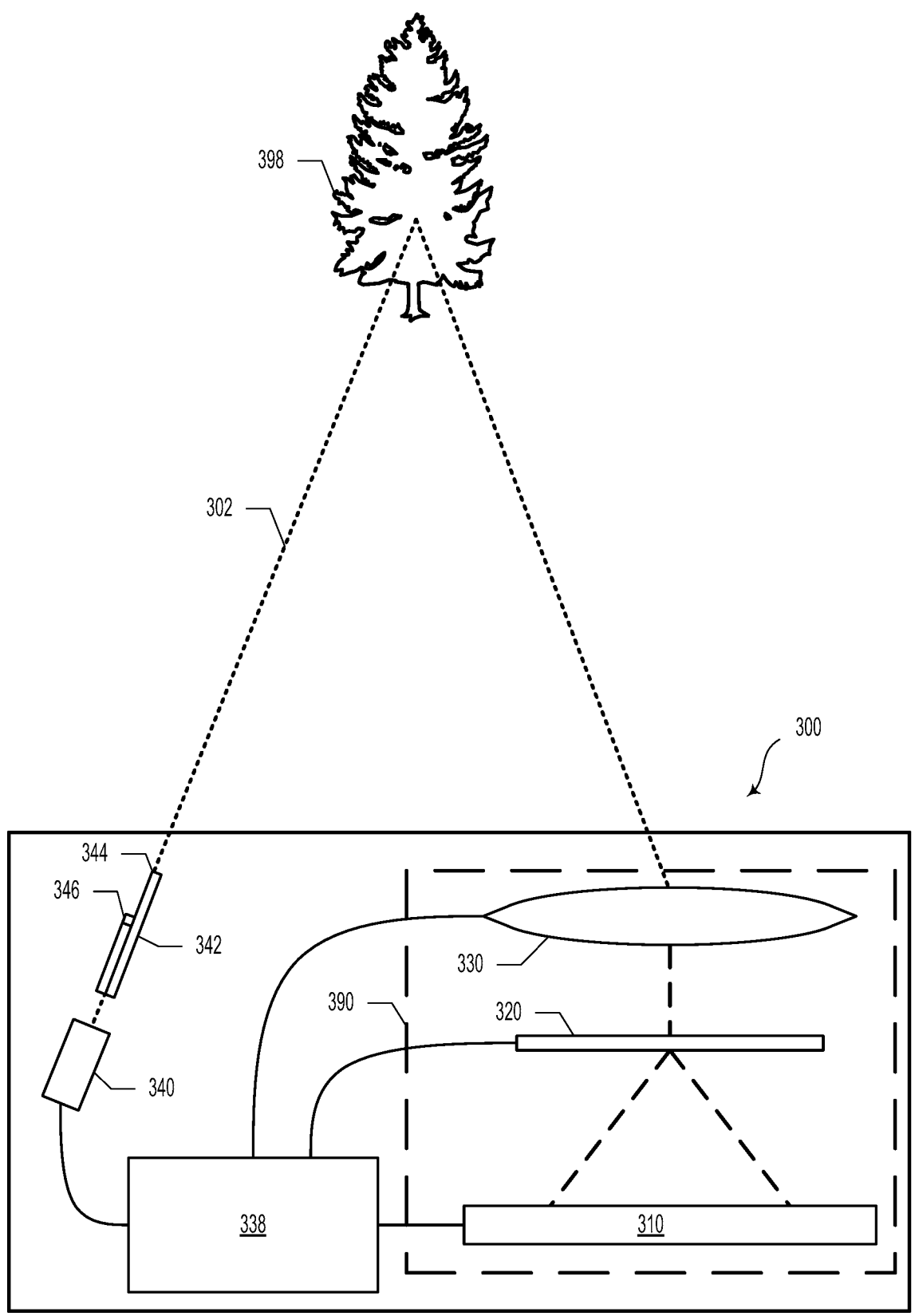
FIG. 3 illustrates a simplified block diagram of a LIDAR device, according to an example embodiment.

FIG. 3 illustrates a simplified block diagram of a LIDAR device 300, according to an example embodiment. At least a portion of LIDAR device 300 may include elements similar to, or identical to, elements of optical systems 100 and 200, as illustrated and described in relation to FIGS. 1 and 2.

In some example embodiments, LIDAR device 300 can be mounted to a vehicle and employed to map a surrounding environment (e.g., the scene including object 398, etc.) of the vehicle. As illustrated in FIG. 3, LIDAR device 300 includes a controller 338, one or more lasers 340, and a receiver subsystem 390. In this example, the receiver subsystem 390 may include an array of light detectors 310, an opaque material 320 with an aperture defined therein (not shown), and a lens 330.

The controller 338 may be similar or identical to controller 150, as illustrated and described in relation to FIG. 1. As such, some or all of the functionality or operations described in relation to controller 150 may be performed by controller 338.

The one or more lasers 340 may be similar to the plurality of light-emitting devices 110 as illustrated and described in relation to FIG. 1.

In some embodiments, the LIDAR device 300 may include a light guide manifold 342. The light guide manifold 342 may include, but need not be limited to, a polymeric waveguide arranged along a substrate. The light guide manifold may be configured to couple to (e.g., waveguide) at least a portion of the light emitted by the one or more lasers 340 as coupled light. The coupled light may be transmitted via an end facet 344 and/or an angled surface 346 of the light guide manifold 342.

It will be understood that the LIDAR device 300 may include a plurality of light guide manifolds that may correspond with respective light-emitter devices of a plurality of light-emitter devices. In an example embodiment, each light guide manifold of the plurality of light guide manifolds may be configured to transmit light into the environment at a different manner. For example, the transmitted light from each respective light guide manifold may be emitted along a different angle with respect to the LIDAR device 300.

Other optical arrangements of the light guide manifold(s) and light-emitter devices are possible and contemplated herein.

It will be understood that LIDAR device 300 may alternatively include more or fewer components than those shown. For example, LIDAR device 300 may include an optical filter.

LIDAR device 300 may cause the one or more lasers 340 to emit light 302 toward a scene that includes object 398. To that end, in some implementations, the one or more lasers 340 (and/or one or more other components of LIDAR device 300) can be configured as a LIDAR transmitter of LIDAR device 300. LIDAR device 300 may then detect reflections of light 302 from the scene to map or otherwise determine information about object 398. To that end, in some implementations, the array of light detectors 310 (and/or one or more other components of the receiver subsystem 390) can be configured as a LIDAR receiver of LIDAR device 300.

In some embodiments, controller 338 may be configured to control components of LIDAR device 300 and to analyze signals received from components of LIDAR device 300 (e.g., the array of light detectors 310). To that end, controller 338 may include one or more processors (e.g., a microprocessor, etc.) that execute instructions stored in a memory (not shown) of LIDAR device 300 so as to operate LIDAR device 300. Additionally or alternatively, controller 338 may include digital and/or analog circuitry configured to perform one or more of the various functions described herein.

In some implementations, controller 338 may use timing information associated with a signal measured by the array of light detectors 310 to determine a location (e.g., distance from LIDAR device 300) of object 398. For example, in embodiments where the one or more lasers 340 include a pulsed laser, controller 338 can monitor timings of output light pulses and compare those timings with timings of signal pulses measured by the array of light detectors 310. For instance, controller 338 can estimate a distance between the LIDAR device 300 and the object 398 based on the speed of light and the time of travel of the light pulse (which can be calculated by comparing the timings). In some implementations, controller 338 may be configured to account for parallax (e.g., due to the one or more lasers 340 and lens 330 not being located at the same location in space). By accounting for the parallax, controller 338 can improve accuracy of the comparison between the timing of the output light pulses and the timing of the signal pulses measured by the array of light detectors 310.

In some implementations, controller 338 could modulate light 302 emitted by the one or more lasers 340. For example, controller 338 could change the projection (e.g., pointing) direction of the one or more lasers 340 (e.g., by actuating a mechanical stage that mounts the one or more lasers 340). As another example, controller 338 could modulate the timing, the power, or the wavelength of light 302 emitted by the one or more lasers 340. In some implementations, controller 338 may also control other operational aspects of the LIDAR device 300, such as adding or removing filters along a path of propagation of light 302, adjusting relative positions of various components of the LIDAR device 300 (e.g., the array of light detectors 310, opaque material 320 (and an aperture therein), lens 330, etc.), among other possibilities.

In some implementations, controller 338 could also adjust an aperture (not shown) within opaque material 320. In some embodiments, the aperture may be selectable from a number of apertures defined within the opaque material. In such embodiments, a MEMS mirror could be located between lens 330 and opaque material 320 and may be adjustable by controller 338 to direct the focused light from lens 330 to one of the multiple apertures. In some embodiments, the various apertures may have different shapes and sizes. In still other embodiments, the aperture may be defined by an iris (or other type of diaphragm). The iris may be expanded or contracted by controller 338, for example, to control the size or shape of the aperture.

Thus, in some examples, LIDAR device 300 can modify a configuration of the receiver subsystem 390 to obtain additional or different information about object 398 and/or the scene. In one example, controller 338 may select a larger aperture in response to a determination that background noise received by system from the scene is currently relatively low (e.g., during night-time). The larger aperture, for instance, may allow the receiver subsystem 390 to detect a portion of light 302 that would otherwise be focused by lens 330 outside the aperture. In another example, controller 338 may select a different aperture position to intercept the portion of light 302. In yet another example, controller 338 could adjust a distance between the aperture and the array of light detectors 310. By doing so, for instance, the cross-sectional area of a detection region in the array of light detectors 310 (i.e., cross-sectional area of light 302 at the array of light detectors 310) can be adjusted.

However, in some scenarios, the extent to which the configuration of receiver subsystem 390 can be modified may depend on various factors such as a size of the LIDAR device 300 or the receiver subsystem 390, among other factors. For example, a size of the array of light detectors 310 may be based on an extent of divergence of light 302 from a location of an aperture to a location of the array of light detectors 310. Thus, for instance, the maximum vertical and horizontal extents of the array of light detectors 310 may be based on the physical space available for accommodating the receiver subsystem 390 within the LIDAR device 300.

As noted above, in some implementations, where the one or more lasers 340 and the lens 330 have different physical locations, the scanned representation of object 398 may be susceptible to parallax associated with the spatial offset between the transmit path of light 302 emitted by the one or more lasers 340 and the receive path of light 302 (e.g., light reflected from the object 398) incident on lens 330.

Although the one or more lasers 340 is shown to be physically separate from the receiver subsystem 390, the LIDAR device 300 may alternatively include the one or more lasers 340 as being co-located or otherwise proximate to the receiver subsystem 390 such that the transmit and receive paths of the LIDAR device 300 are co-aligned, or nearly so (e.g., both paths propagate through lens 330), to reduce or prevent the effects of such parallax. Thus, it is noted that the various functional blocks shown for the components of the LIDAR device 300 can be redistributed, rearranged, combined, and/or separated in various ways different than the arrangement shown.

III. Example Methods

FIGS. 4A-4E illustrate various blocks or steps of a manufacturing method, according to an example embodiment. It will be understood that the illustrated blocks or steps may be performed in an order different than that presented in FIGS. 4A-4E and that various steps or blocks could be inserted, repeated, and/or deleted.

Figure 4A:
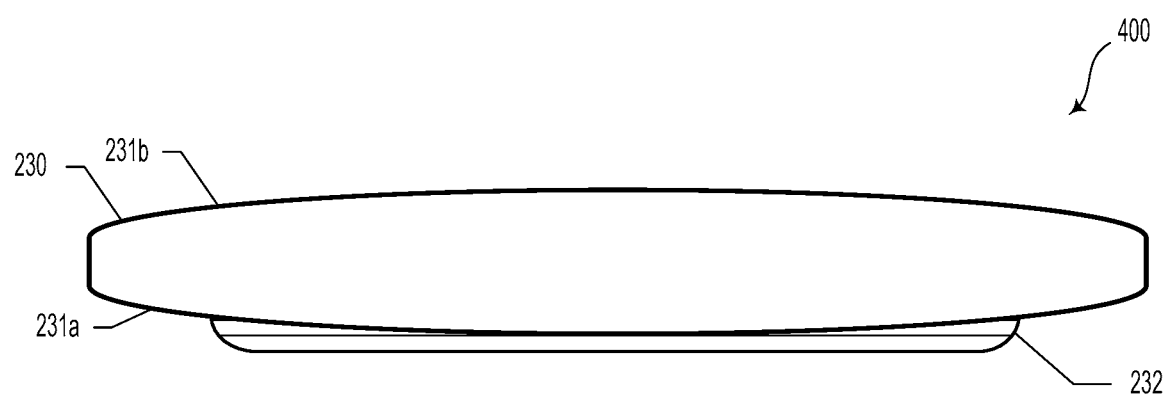
FIG. 4A illustrates a block of a manufacturing method, according to an example embodiment.

FIG. 4A illustrates a block 400 of a manufacturing method, according to an example embodiment. Block 400 may include applying a layer or coating of index-matched epoxy 232 to a first surface 231a of an optical element 230. Additionally or alternatively, the index-matched epoxy 232 could be applied to a second surface 231b of the optical element. As described elsewhere herein, the index-matched epoxy 232 could have a gel-like or liquid-like consistency when applied. In some embodiments, the index-matched epoxy 232 may be applied using a syringe, however other application methods are possible and contemplated. In some embodiments, the index-matched epoxy 232 may have an index of refraction of about 1.5 (e.g., 1.52).

Figure 4B:
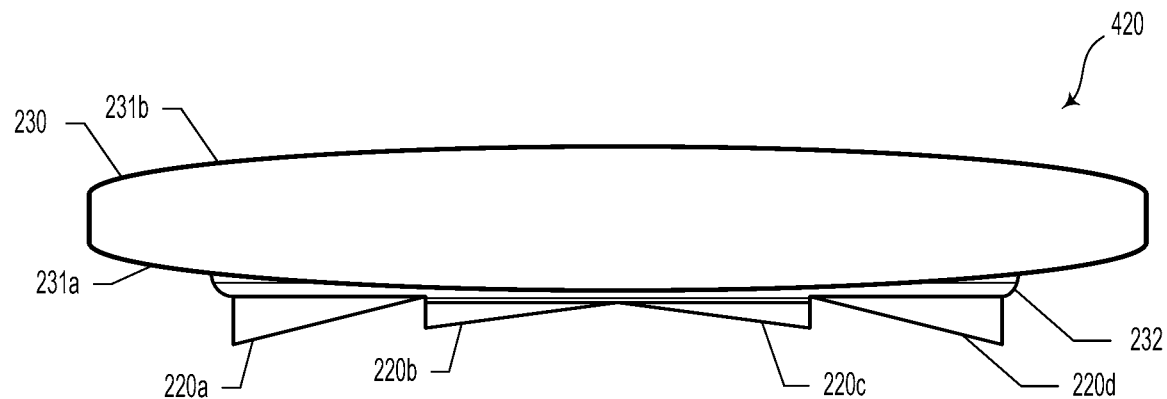
FIG. 4B illustrates a block of a manufacturing method, according to an example embodiment.

FIG. 4B illustrates a block 420 of a manufacturing method, according to an example embodiment. Block 420 includes coupling a plurality of adjustable optical surfaces 220a-d to the optical element 230. As illustrated in FIG. 4B, the plurality of adjustable optical surfaces 220a-d could be physically coupled to the optical element 230 via the index-matched epoxy 232. In other words, block 420 may include the plurality of adjustable optical surfaces 220a-d being placed on and/or pushed into the index-matched epoxy 232 so as to physically couple the two optical elements.

Figure 4C:
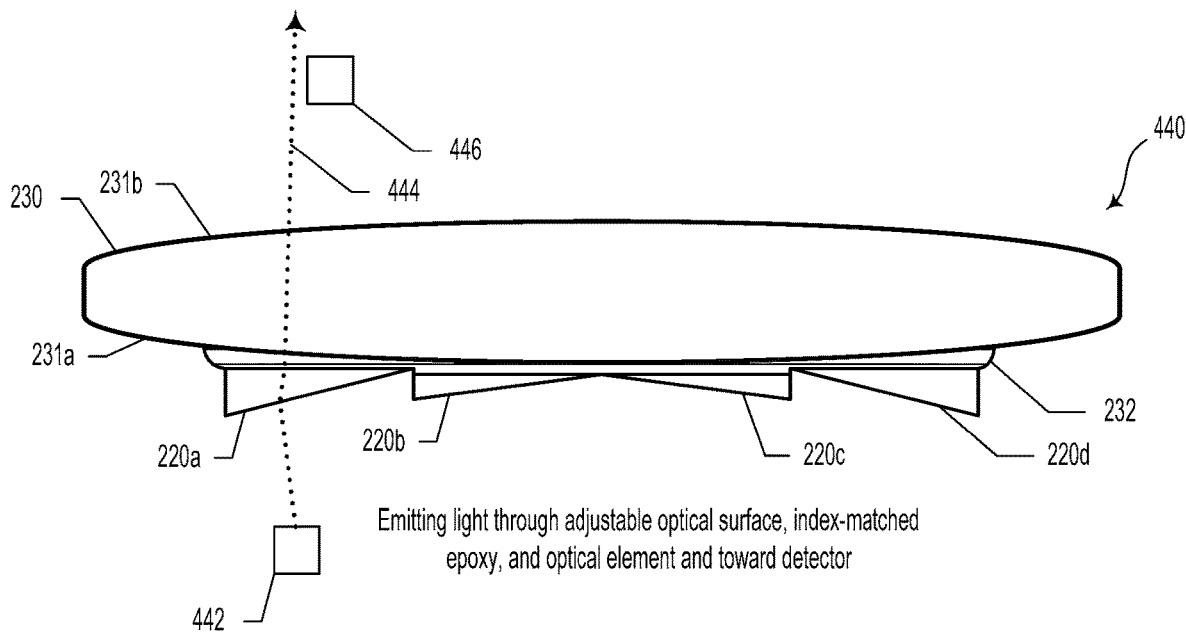
FIG. 4C illustrates a block of a manufacturing method, according to an example embodiment.

FIG. 4C illustrates a block 440 of a manufacturing method, according to an example embodiment. Block 440 includes emitting light through at least one of the adjustable optical surfaces 220a-d. For example, block 440 may include causing a light-emitter device 442 to emit light that interacts with adjustable optical surface 220a, the index-matched epoxy 232, and the optical element 230. At least a portion of the emitted light may be transmitted as transmitted light 444. In an example embodiment, the transmitted light 444 may travel toward a detector 446.

Figure 4D:
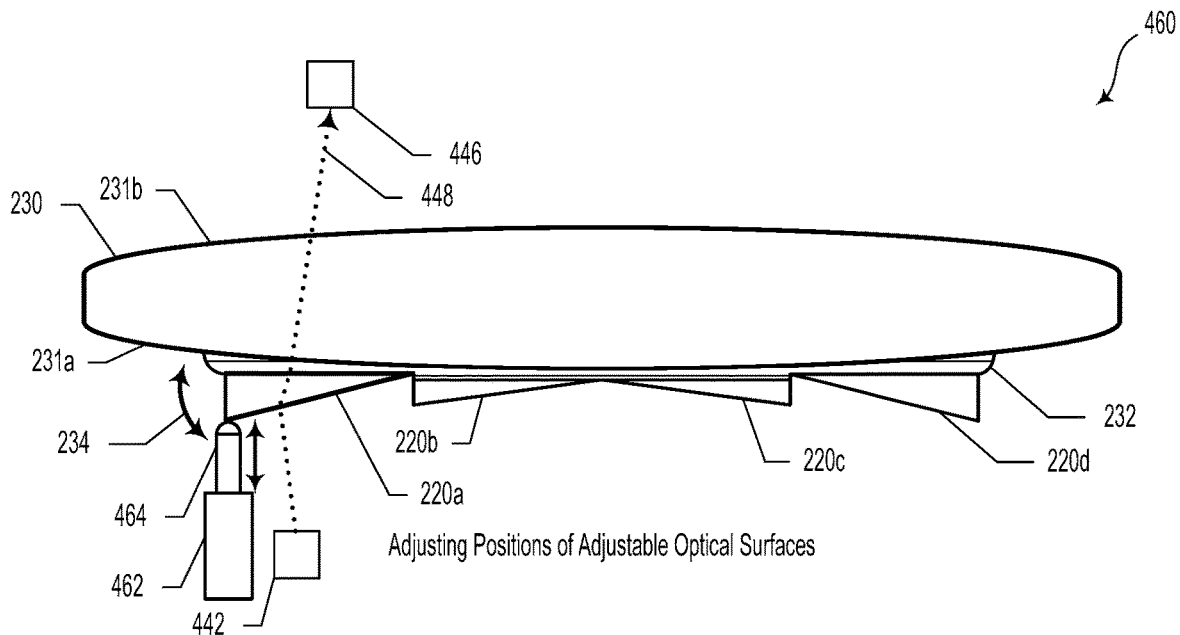
FIG. 4D illustrates a block of a manufacturing method, according to an example embodiment.

FIG. 4D illustrates a block 460 of a manufacturing method, according to an example embodiment. Block 460 may include adjusting a position of one or more of the adjustable optical surfaces 220a-d so as to obtain a desired beam profile 448, as detected by detector 446. In some embodiments, the position of the one or more adjustable optical surfaces 220a-d could be adjusted with an actuator 462. As a non-limiting example, the actuator 462 may include a piston portion 464 that may be controlled to exert a force on the adjustable optical surface 220a so as to adjust its angular orientation 234. The actuator 462 may take other forms, such as: a piezoelectric material, a movable stage, a micro-electromechanical system (MEMS) actuator, a movable mirror, and/or as otherwise described elsewhere herein.

In some embodiments, the actuator 462 may adjust the position of the one or more adjustable optical surfaces 220a-d until a desired beam profile 448 is detected, determined, or otherwise measured by way of detector 446.

Figure 4E:
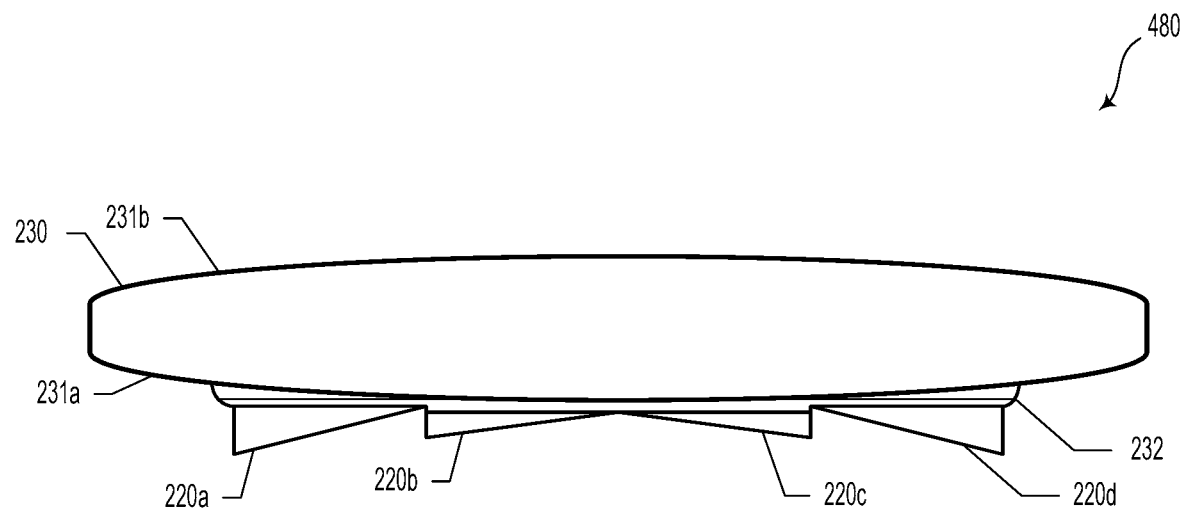
FIG. 4E illustrates a block of a manufacturing method, according to an example embodiment.

FIG. 4E illustrates a block 480 of a manufacturing method, according to an example embodiment. Block 480 includes fixing the one or more adjustable optical surfaces 220a-d to the optical element 230. In an example embodiment, once the desired beam profile 448 is determined, block 480 may include waiting until the index-matched epoxy 232 has cured, set, hardened, or otherwise solidified. In another example embodiment, block 480 may include causing a light source to expose the index-matched epoxy 232 with UV light so as to cure and solidify such materials. Other ways to fix the one or more adjustable optical surfaces 220a-d to the optical element 230 are contemplated herein.

Figure 5:
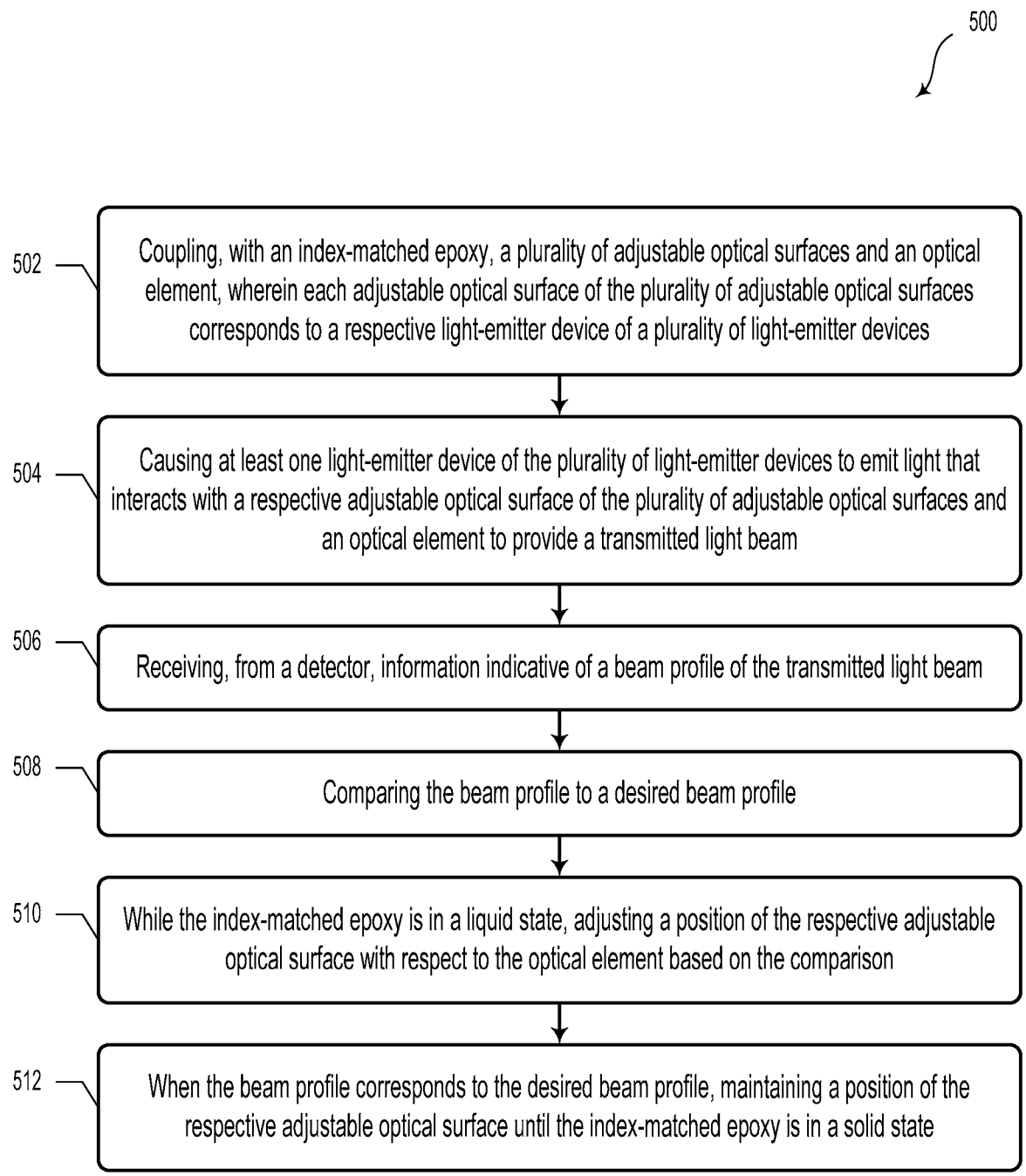
FIG. 5 illustrates a method, according to an example embodiment.

FIG. 5 illustrates a method 500, according to an example embodiment. Method 500 may include or involve some or all of blocks 400, 420, 440, 460, and 480, as illustrated and described in reference to FIGS. 4A-4E. Furthermore, method 500 may include elements that are similar or identical to those illustrated and described with reference to FIGS. 1 and 2. As such, method 500 may be carried out, in full or in part, by optical systems 100 and 200. Yet further, method 500 may be carried out so as to provide at least a portion of the LIDAR device 300, as illustrated and described in reference to FIG. 3.

It will be understood that the method 500 may include fewer or more steps or blocks than those expressly disclosed herein. Furthermore, respective steps or blocks of method 500 may be performed in any order and each step or block may be performed one or more times.

Block 502 includes coupling, with an index-matched epoxy, a plurality of adjustable optical surfaces and an optical element. In an example embodiment, the plurality of adjustable optical surfaces may include at least one of: a plurality of wedge prisms or a plurality of transparent plates. In example embodiments, the plurality of adjustable optical surfaces, the optical element, and the index-matched epoxy may include a similar or identical index of refraction when the index-matched epoxy is in the solid state.

Each adjustable optical surface of the plurality of adjustable optical surfaces may be associated with at least one light-emitter device of a plurality of light-emitter devices. An example of coupling the plurality of adjustable optical surfaces with the optical element is illustrated and described in relation to FIG. 4B. However, other ways to couple the plurality of adjustable optical surfaces with the optical element are possible and contemplated.

In some embodiments, the optical element may include at least one of: an end facet of a light guide manifold, an angled surface of the light guide manifold, a lens, or an optical diffuser. As described with regard to FIG. 3, the light guide manifold may include a polymeric waveguide (e.g., SU-8) arranged along a substrate. The light guide manifold may be configured to couple to (e.g., waveguide) at least a portion of the light emitted by one or more light-emitter devices.

Block 504 includes causing at least one light-emitter device of the plurality of light-emitter devices to emit light that interacts with at least one adjustable optical surface associated with the at least one light-emitter device and an optical element to provide a transmitted light beam. As described elsewhere herein, the plurality of light-emitter devices may include at least one of: a laser bar or a laser bar stack. An example of block 504 is illustrated and described in relation to FIG. 4C.

Block 506 includes receiving, from a detector, information indicative of a beam profile of the transmitted light beam. For example, the detector may be configured to provide information indicative of an intensity, a photon flux, and/or a fluence of the transmitted light beam. Additionally or alternatively, the detector may be configured to provide information indicative of a beam spot size, a beam spot shape, or another characteristic of the transmitted light beam.

In example embodiments, the detector may include an image sensor. Furthermore, in some example embodiments, the detector could be controllably operated at various locations within an environment of the other elements of the optical system. For example, the detector may be positioned at one of: a near-field location or a far-field location. That is, in some embodiments, the detector may provide information indicative of the transmitted light beam while being located at the near-field location, the far-field location, or any other location within the environment of the optical system.

Block 508 includes comparing the beam profile to a desired beam profile. As described elsewhere herein, the desired beam profile may include a desired beam intensity, a desired beam shape, a desired beam position, and/or one or more other properties of optical light beams. In an example embodiment, the desired beam profile may correspond to a desired beam spot size and a desired beam angle.

Block 510 includes, while the index-matched epoxy is in a liquid state, adjusting a position of the at least one adjustable optical surface with respect to the optical element based on the comparison. In an example embodiment, adjusting a position of the at least one adjustable optical surface may include causing an actuator to adjust the position of the at least one adjustable optical surface. For instance, as described herein, adjusting the position of the adjustable optical surface could include causing a controllable effector configured to apply a force to the adjustable optical surface. The applied force could include direct physical pressure, an electrostatic force, an electromagnetic force, or another type of force.

An example of blocks 506, 508, and 510 is illustrated and described in relation to FIG. 4D.

Block 512 includes, when the beam profile corresponds to the desired beam profile, maintaining a position of the at least one adjustable optical surface until the index-matched epoxy is in a solid state. Additionally or alternatively, method 500 may include exposing the index-matched epoxy to UV light so as to cure the index-matched epoxy.

In some embodiments, method 500 includes repeating the steps or blocks of method 500 for each light-emitter device of the plurality of light-emitter devices. That is, method 500 could include adjusting a position of each light-emitter device with respect to the optical element so as to provide a respective desired beam profile.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
   a controller comprising at least one processor and a memory, wherein the at least one processor executes program instructions stored in the memory so as to carry out operations, the operations comprising:
      coupling, with an index-matched epoxy, a plurality of adjustable optical surfaces and an optical element, wherein each adjustable optical surface of the plurality of adjustable optical surfaces is associated with a respective light-emitter device of a plurality of light-emitter devices;
      causing at least one light-emitter device of the plurality of light-emitter devices to emit light that interacts with at least one adjustable optical surface associated with the at least one light-emitter, the index-matched epoxy, device and the optical element to provide a transmitted light beam;
      receiving, from a detector, information indicative of a beam profile of the transmitted light beam;
      comparing the beam profile to a desired beam profile, wherein the desired beam profile comprises at least a desired beam spot size or a desired beam angle;
      while the index-matched epoxy is in a liquid state and while the emitted light interacts with the at least one adjustable optical surface, the index-matched epoxy, and the optical element, adjusting a position of the at least one adjustable optical surface with respect to the optical element based on the comparison; and
      when the beam profile corresponds to the desired beam profile, maintaining a position of the at least one adjustable optical surface until the index-matched epoxy is in a solid state.

2. The system of claim 1, wherein the plurality of light-emitter devices comprises a plurality of laser bars or a plurality of laser bar stacks.

3. The system of claim 1, wherein the plurality of adjustable optical surfaces comprises at least one of: a plurality of wedge prisms or a plurality of transparent plates.

4. The system of claim 1, wherein the plurality of adjustable optical surfaces, the optical element, and the index-matched epoxy comprise a same index of refraction when the index-matched epoxy is in the solid state.

5. The system of claim 1, wherein the detector comprises an image sensor positioned at one of: a near-field location or a far-field location.

6. The system of claim 1, wherein the optical element comprises at least one of: a lens, an optical diffuser, an end facet of a light guide manifold, or an angled surface of the light guide manifold.

7. A method comprising:
   coupling, with an index-matched epoxy, a plurality of adjustable optical surfaces and an optical element, wherein each adjustable optical surface of the plurality of adjustable optical surfaces is associated with a respective light-emitter device of a plurality of light-emitter devices;
   causing at least one light-emitter device of the plurality of light-emitter devices to emit light that interacts with at least one adjustable optical surface associated with the at least one light-emitter device, the index-matched epoxy, and the optical element to provide a transmitted light beam;

receiving, from a detector, information indicative of a beam profile of the transmitted light beam;

comparing the beam profile to a desired beam profile, wherein the desired beam profile comprises at least a desired beam spot size or a desired beam angle;

while the index-matched epoxy is in a liquid state and while the emitted light interacts with the at least one adjustable optical surface, the index-matched epoxy, and the optical element, adjusting a position of the at least one adjustable optical surface with respect to the optical element based on the comparison; and when the beam profile corresponds to the desired beam profile, maintaining a position of the at least one adjustable optical surface until the index-matched epoxy is in a solid state.

8. The method of claim 7, further comprising:

repeating the method for each light-emitter device of the plurality of light-emitter devices.

9. The method of claim 7, wherein the plurality of light-emitter devices comprises at least one of a laser bar or a laser bar stack.

10. The method of claim 7, wherein the plurality of adjustable optical surfaces comprises at least one of: a plurality of wedge prisms or a plurality of transparent plates.

11. The method of claim 7, wherein the plurality of adjustable optical surfaces, the optical element, and the index-matched epoxy comprise a same index of refraction when the index-matched epoxy is in the solid state.

12. The method of claim 7, further comprising exposing the index-matched epoxy to UV light so as to cure the index-matched epoxy.

13. The method of claim 7, wherein the optical element comprises an end facet of a light guide manifold, an angled surface of the light guide manifold, a lens, or an optical diffuser.

14. The method of claim 7, wherein adjusting a position of the at least one adjustable optical surface comprises causing an actuator to adjust the position of the at least one adjustable optical surface.

15. The system of claim 1, wherein the desired beam profile corresponds to aligning the transmitted light beam with at least one other transmitted light beam of the plurality of light emitted devices further comprising aligning the transmitted light beam with the at least one other transmitted light beam, wherein aligning the transmitted light beam with the at least one other transmitted light beam comprises adjusting the position of the at least one adjustable optical surface with respect to the optical element based on the comparison.

16. The system of claim 1, wherein the plurality of adjustable optical elements are separated from the plurality of light emitting devices along an optical beam path, and wherein each adjustable optical element is configured to align a different light beam.

17. The method of claim 7, wherein the transmitted light beam is a first light beam of a plurality of light beams corresponding to the plurality of light-emitter devices, the method further comprising aligning the plurality of light beams by adjusting respective positions of a plurality of adjustable optical surfaces to provide a plurality of light beams that are aligned with the first light beam and substantially parallel to an optical axis.

18. An optical system prepared by a process comprising the steps of:

coupling, with an index-matched epoxy, a plurality of adjustable optical surfaces and an optical element, wherein each adjustable optical surface of the plurality of adjustable optical surfaces is associated with a respective light-emitter device of a plurality of light-emitter devices;

causing at least one light-emitter device of the plurality of light-emitter devices to emit light that interacts with at least one adjustable optical surface associated with the at least one light-emitter device, the index-matched epoxy, and the optical element to provide a transmitted light beam;

receiving, from a detector, information indicative of a beam profile of the transmitted light beam;

comparing the beam profile to a desired beam profile, wherein the desired beam profile comprises at least a desired beam spot size or a desired beam angle;

while the index-matched epoxy is in a liquid state and while the emitted light interacts with the at least one adjustable optical surface, the index-matched epoxy, and the optical element, adjusting a position of the at least one adjustable optical surface with respect to the optical element based on the comparison; and when the beam profile corresponds to the desired beam profile, maintaining a position of the at least one adjustable optical surface until the index-matched epoxy is in a solid state.

19. The method of claim 7, wherein the desired beam profile further comprises one or more of a desired intensity, a desired beam shape, and a desired wavelength.

20. The method of claim 7, wherein comparing the beam profile to a desired beam profile comprises one or more of:

determining whether the beam profile spatially overlaps the desired beam profile;

compare an intensity of the beam profile to a desired beam profile intensity threshold; and determining whether the intensity of the beam profile is within a desired beam profile intensity range.

* * * * *